United States Patent
Walters et al.

(10) Patent No.: US 12,412,314 B2
(45) Date of Patent: Sep. 9, 2025

(54) COLOR CONVERSION BETWEEN COLOR SPACES USING REDUCED DIMENSION EMBEDDINGS

(71) Applicant: Capital One Services, LLC, McLean, VA (US)

(72) Inventors: Austin Grant Walters, Savoy, IL (US); Jeremy Edward Goodsitt, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/609,524

(22) Filed: Mar. 19, 2024

(65) Prior Publication Data
US 2024/0221232 A1    Jul. 4, 2024

Related U.S. Application Data

(63) Continuation of application No. 18/144,766, filed on May 8, 2023, now Pat. No. 11,961,267, which is a (Continued)

(51) Int. Cl.
*G06T 9/00*   (2006.01)
*G06F 18/24*  (2023.01)
(Continued)

(52) U.S. Cl.
CPC .............. *G06T 9/002* (2013.01); *G06F 18/24* (2023.01); *G06T 7/10* (2017.01); *G06T 7/90* (2017.01);
(Continued)

(58) Field of Classification Search
CPC .. G06T 9/002; G06T 7/10; G06T 7/90; G06T 2207/10024; G06T 2207/20081; G06T 2207/20084
See application file for complete search history.

(56) References Cited

U.S. PATENT DOCUMENTS 5,638,496 A * 6/1997 Sato ................... H04N 1/00875
                                                358/1.9
6,985,252 B1 * 1/2006 Kubo ................... H04N 1/6022
                                                358/1.9
(Continued)

FOREIGN PATENT DOCUMENTS

JP    2017016635 A    1/2017
KR    20120013405 A   2/2012

OTHER PUBLICATIONS

Baluja et al âTask specific color spaces and compressions for machine based object recognitionâ (Year: 2019).*

*Primary Examiner* — Sean T Motsinger
(74) *Attorney, Agent, or Firm* — KDW Firm PLLC

(57) ABSTRACT

Exemplary embodiments may provide an approach to converting multidimensional color data for an image encoded in a first color space into an intermediate form that is a single dimensional value. The exemplary embodiments may then decode the intermediate form value to produce an encoding of the color data that is encoded in a second color space that differs from the first color space. In this manner, the data for the image may be efficiently converted from an encoding in the first color space into an encoding in the second color space.

20 Claims, 9 Drawing Sheets

Related U.S. Application Data continuation of application No. 17/690,404, filed on Mar. 9, 2022, now Pat. No. 11,645,787, which is a continuation of application No. 16/997,383, filed on Aug. 19, 2020, now Pat. No. 11,302,036.

(51) Int. Cl.
*G06T 7/10* (2017.01)
*G06T 7/90* (2017.01)

(52) U.S. Cl.
CPC ............. *G06T 2207/10024* (2013.01); *G06T 2207/20081* (2013.01); *G06T 2207/20084* (2013.01)

(56) References Cited

U.S. PATENT DOCUMENTS

| | | | |
|---|---|---|---|
| 7,180,629 B1* | 2/2007 | Nishio | H04N 23/88 358/1.9 |
| 10,944,914 B1* | 3/2021 | Le | H04N 25/58 |
| 11,302,036 B2* | 4/2022 | Walters | G06T 9/002 |
| 11,645,787 B2* | 5/2023 | Walters | G06V 10/44 382/157 |
| 11,961,267 B2* | 4/2024 | Walters | G06T 5/90 |
| 2003/0235923 A1* | 12/2003 | Jurik | G01N 21/78 435/14 |
| 2005/0128491 A1* | 6/2005 | Kubo | H04N 1/6022 358/1.1 |
| 2017/0339430 A1* | 11/2017 | Kalevo | H04N 1/60 |
| 2019/0108618 A1* | 4/2019 | Hwang | G06T 3/4046 |
| 2019/0205668 A1* | 7/2019 | Noda | G06T 7/73 |
| 2019/0371433 A1* | 12/2019 | Wang | G16H 30/40 |
| 2021/0035331 A1* | 2/2021 | Xie | H04N 19/625 |
| 2021/0133522 A1* | 5/2021 | Chang | G06F 16/2282 |
| 2021/0158096 A1* | 5/2021 | Sinha | G06N 3/08 |
| 2021/0200501 A1* | 7/2021 | Stankoulov | G06F 3/0488 |
| 2021/0241522 A1* | 8/2021 | Guler | G06V 40/103 |
| 2021/0304389 A1* | 9/2021 | Li | G06F 18/2413 |
| 2022/0058835 A1* | 2/2022 | Walters | G06V 10/56 |
| 2022/0198718 A1* | 6/2022 | Walters | H04N 19/40 |

\* cited by examiner

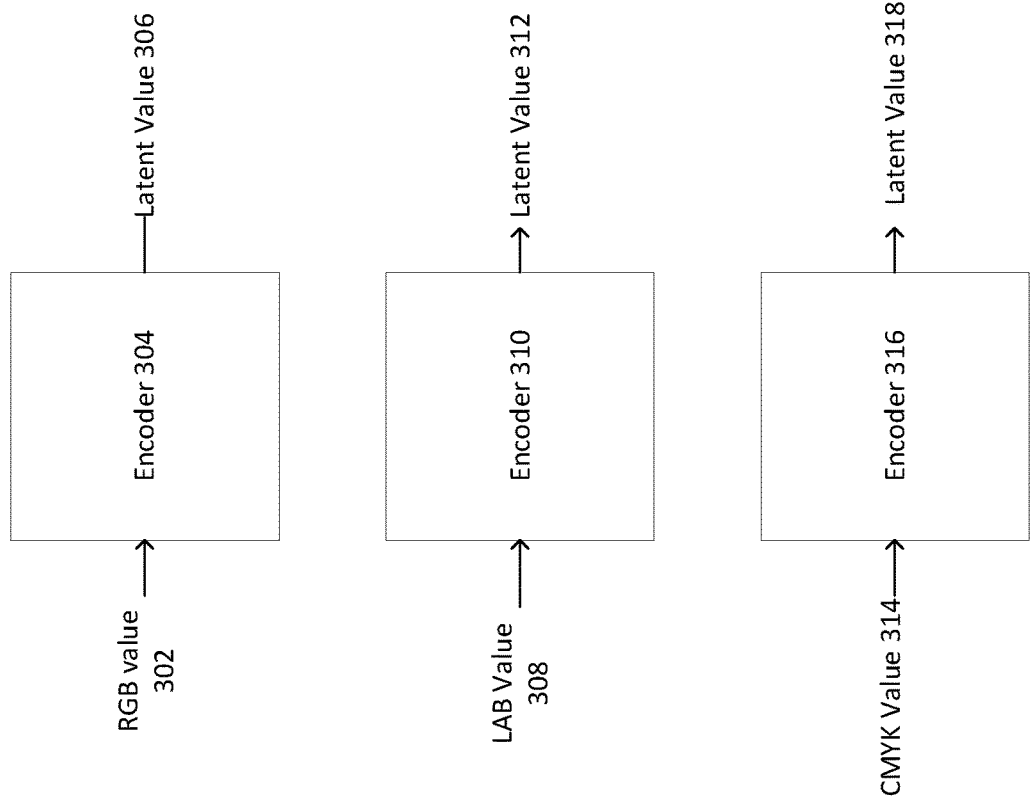

COLOR CONVERSION BETWEEN COLOR SPACES USING REDUCED DIMENSION EMBEDDINGS

CROSS-REFERENCE TO RELATED APPLICATIONS

This application is a continuation of U.S. patent application Ser. No. 18/144,766, filed May 8, 2023, which is a continuation of U.S. patent application Ser. No. 17/690,404 filed Mar. 9, 2022, which is a continuation of U.S. patent application Ser. No. 16/997,383, entitled "COLOR CONVERSION BETWEEN COLOR SPACES USING REDUCED DIMENSION EMBEDDINGS" filed on Aug. 19, 2020. The contents of the aforementioned applications are incorporated herein by reference in their entirety.

BACKGROUND

Color data for two dimensional images is typically encoded on a pixel by pixel basis. Thus, color data is encoded for the pixels that make up the images. For three dimensional images, the color data is encoded for the voxels that make up the image. How the color data is represented is dependent on the color space used for the encoding. The color space is a model that describes the colors of the elements of an image (e.g., pixels or voxels) as tuples of numbers. For example, in the RGB color space, the color is represented as a combination of red, green and blue color components. Each color for an element of an image is represented by a tuple of red, green and blue color component values, with each value being in the range between 0 and 255.

Color spaces differ in their representation of that color data. For instance, the CIELAB or LAB color space represents color as three values: L for the Luminance/Lightness and Alpha (A) and Beta (B) for the green-red and blue-yellow color components, respectively. The LAB color space is typically used when converting from RGB color space model into Cyan-Magenta-Yellow-Black (CMYK) color space. For some images, representing its color data in the LAB color space model provides better edge detection results than other color spaces, including the RGB model.

It may be useful sometimes to convert an image from a source color space to a target color space. For instance, it may be easier to perform object recognition or edge detection in the target space rather than in the source color space. Unfortunately, since image data can be quite large, the computational cost and the memory requirements for performing such color space conversion may be onerous.

SUMMARY

In accordance with an exemplary embodiment, a method is performed wherein a computing device converts multi-dimensional color data encoded in a first color space for a set of pixels in an image into a single dimensional value for each pixel in the set of pixels. The single dimensional values for the pixels in the set of pixels are provided as input into at least a portion of a neural network. With the at least a portion of the neural network, the single dimensional color values of the pixels in the set of pixels are converted into multi-dimensional color values in a second color space that is different than the first color space to produce a representation of the set of pixels in the second color space.

The converting of the multi-dimensional color data may be performed by a neural network. The method may further include training the neural network to perform the converting of the multi-dimensional color data. The neural network used in the converting of the multi-dimensional color data may be part of the neural network that converts the single dimensional color values. The neural network may be a convolutional variational autoencoder. The first color space may be the RGB color space and the second color space is the LAB color space. The first color space or the second color space may be one of an RGB color space, a LAB color space, an HSV color space, a CMYK color space, a YUV color space, a HSL color space, an ICtCp color space or a CIE color space. The multi-dimensional color values in the second color space may be compressed relative to the multidimensional color values in the first color space. The set of pixels may constitute all or substantially all of the pixels of the image.

In accordance with an exemplary embodiment, a method is performed. Per the method, a neural network executes on one or more computing devices and converts multi-dimensional color data encoded in a first color space for a set of pixels in an image into a single dimensional value for each pixel in the set of pixels. An image processing operation is performed on the single dimensional values for the set of pixels.

The image processing operation may be one of image segmentation, image classification, object classification, image filtering or image enhancement. The image processing operation may produce a modified version of the single dimensional values. The method may further comprise converting the modified version of the single dimensional values into multidimensional values in a second color space. The image processing operation may be segmentation and wherein the method further comprises outputting a likely segmentation of the image. The image processing operation may be image classification or object classification and a likely classification of the image or a likely classification of an object in the image may be output. The method may be performed by the neural network.

In accordance with an exemplary embodiment, a non-transitory computer-readable storage medium stores computer-executable instructions for execution by a processor. The instructions cause the processor to receive a set of image color data for an image encoded in a first color space and create an embedded representation of the set of image color data in a latent space with a neural network. A first decoder is trained to convert a representation of the set of image color data in a second color space from the embedded representation. A second decoder is trained to convert a representation of the set of image color data in a third color space from the embedded representation.

Instructions for using the first decoder to convert the representation of the set of image color data in the second color space from the embedded representation may be stored on the storage medium. Instructions for using the second decoder to convert the representation of the set of image color data in the third color space from the embedded representation may be stored on the storage medium. The embedded representation may be a representation of less data dimensionality than the received set of image color data. The embedded representation may have color data of a single dimension.

BRIEF DESCRIPTION OF THE DRAWINGS

FIG. 3 depicts a block diagram of illustrative encoders.

DETAILED DESCRIPTION

Figure 1A:
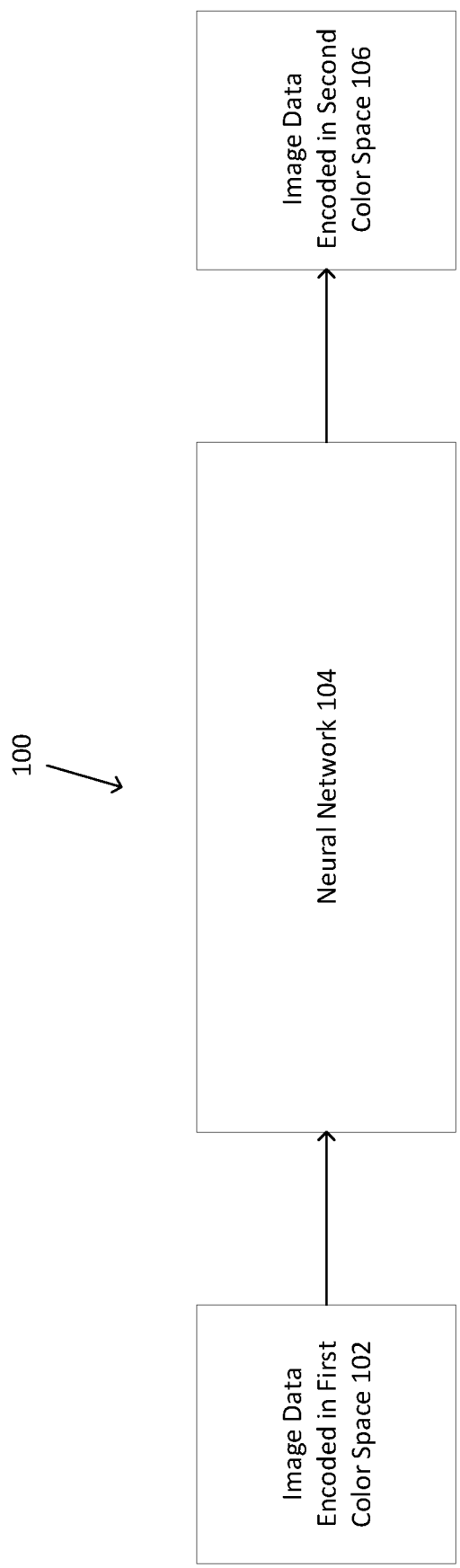
FIG. 1A depicts a block diagram of an illustrative color conversion system for an exemplary embodiment.

Exemplary embodiments may provide an approach to converting multidimensional color data for an image encoded in a first color space into an intermediate form that is a single dimensional value. The exemplary embodiments may then decode the intermediate form value to produce an encoding of the color data that is encoded in a second color space that differs from the first color space. In this manner, the data for the image may be efficiently converted from an encoding in the first color space into an encoding in the second color space. The reduction of the dimensionality of the data in the intermediate form reduces the memory requirements and computational resources needed for the conversion. The conversion may be performed more quickly than conventional conversion approaches that do not reduce the dimensionality of the intermediate form. This model may be used to create embeddings. Other models may be built quickly off the embeddings (similar to text embeddings, see word2vec, glove, etc.). This can improve model accuracy and make models more transferable between domains.

In the exemplary embodiments, the conversion approach may be performed by a neural network. The neural network may receive an encoding of the image data in the first color space as input. The neural network may process the input to produce an embedding in a latent space. The embedding may be a single dimensional value, whereas the input may be a multidimensional value. The portion of the neural network that performs the encoding may be viewed as an encoder. The neural network also may include a decoder that decodes the single dimensional embedding into a multidimensional representation of the color data for the image in the second color space. The neural network may be, for example, a convolutional variational autoencoder or in particular, a multi-modal convolutional variational autoencoder.

The neural network may be trained to realize different encodings. For example, the neural network may be trained to generate an embedding in the latent space from color data for an image encoded in the RGB space, encoded in the LAB space, encoded in the CMYK space, etc. Thus, a number of different encoders may be realized and used as needed, depending on the input. Similarly, the decoding may decode the embedding into color values in the RGB space, in the LAB space, in the CMYK space, etc. Thus, a number of different decoders may be realized and used as needed, depending on the desired output.

The embedding need not be converted directly into an output encoded in a different color space. Image processing operations may be performed on the embeddings for an image and then the resulting processed representation may be used to generate the output in the desired color space. The image processing operations may include, for example, image segmentation, image filtering, image enhancement, image or object classification or other operations.

The neural network is trained on color data for images to learn how to encode the embeddings in the latent space. The neural network also is trained to produce the color data outputs in different color spaces from the embeddings. The training may entail having the neural network process a large amount of training data, such as from a library of image data.

FIG. 1A depicts an illustrative color space conversion system 100 that is suitable for an exemplary embodiment. In the color space conversion system 100. Image data encoded in a first color space 102 is input into a neural network 104 for processing. The neural network 104 processes the image data encoded in the first color space 102 to convert the data into image data encoded in a second color space 106, which is output from the neural network 104. The first color space and the second color space differ. Examples of color spaces include but are not limited to a RGB color space, a LAB color space, a CMYK color space, a XYZ color space, a HSV color space, a YUV color space, a HSL color space, an ICtCp color space or a CIE color space.

Figure 1B:
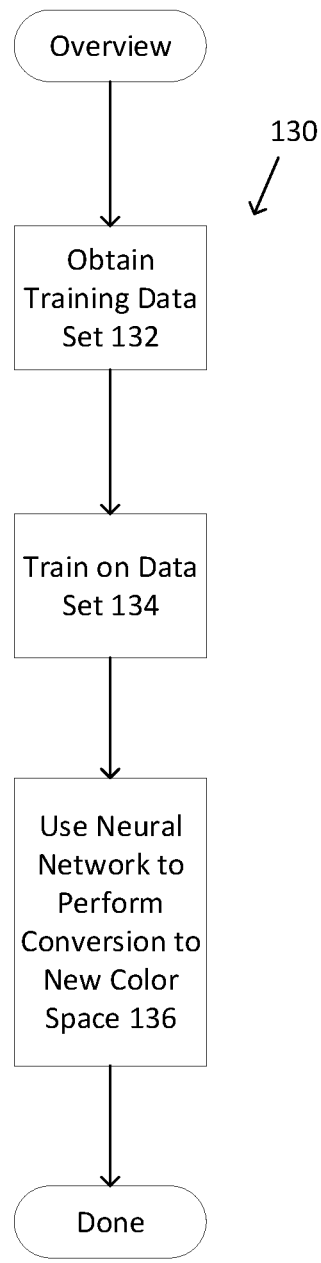
FIG. 1B depicts a flowchart of illustrative steps that may be performed to convert between color spaces using a neural network in an exemplary embodiment.

FIG. 1B provides a flowchart 130 of illustrative steps in the color space conversion process using a neural network in an exemplary embodiment. First, a training set of data is obtained (132). The training set may include image data in input color spaces and the proper conversion of the image data into converted color spaces. The training set preferably is large and diverse so as to ensure that the neural network 104 is properly and fully trained. The neural network is trained on the training set (134). During training, the neural network 104 processes the input image data in the training set and converts the image data into image data encoded in a target color space. The resulting conversion is compared to the correct conversion, and the settings of the nodes in the neural network 104 are adjusted to reduce the error and improve the result based on the comparison. Once the neural network 104 is trained, the neural network 104 is used to perform color conversion to the target color space (136).

Figure 2A:
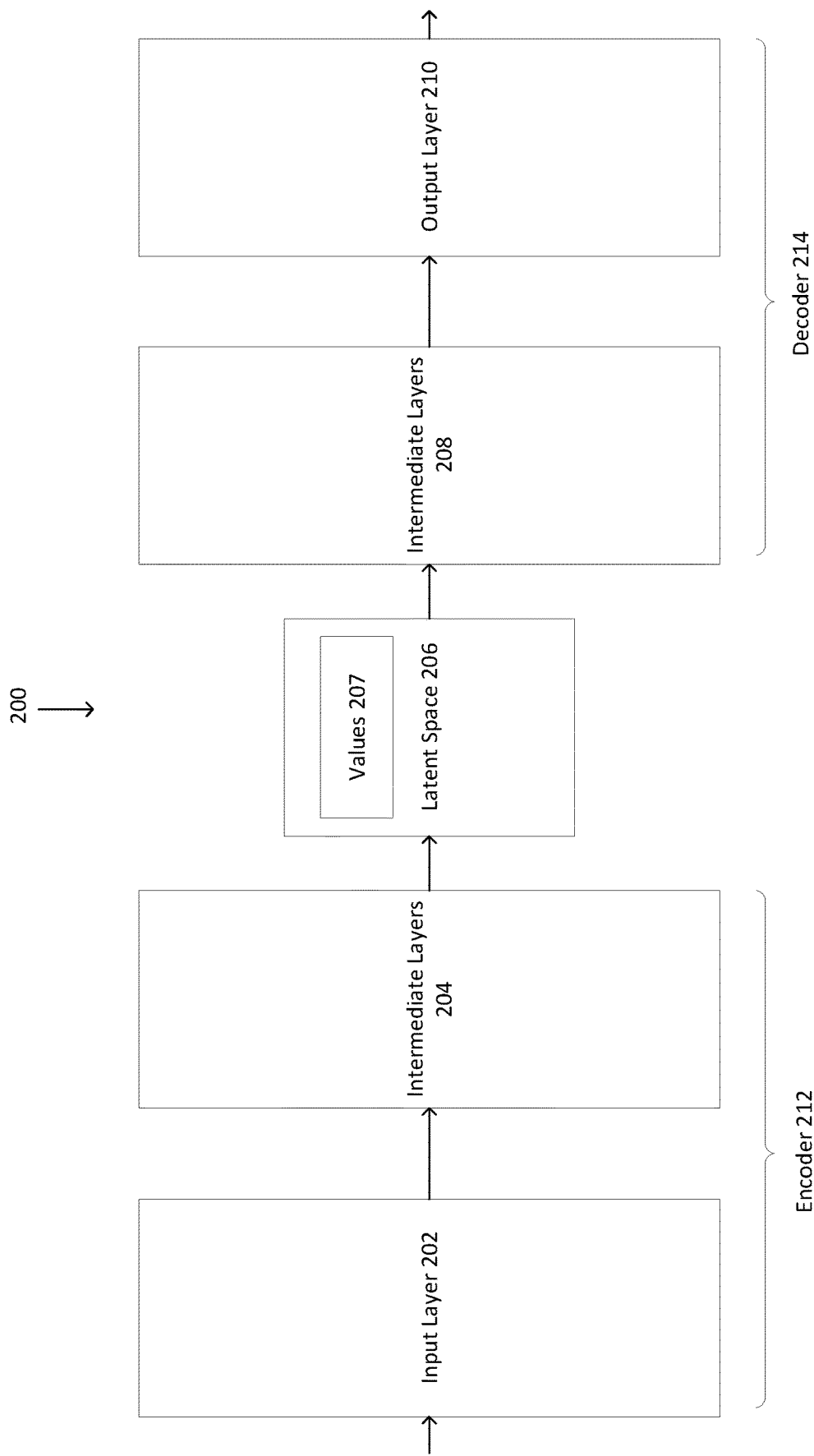
FIG. 2A depicts an illustrative neural network for use in an exemplary embodiment.
Figure 2B:
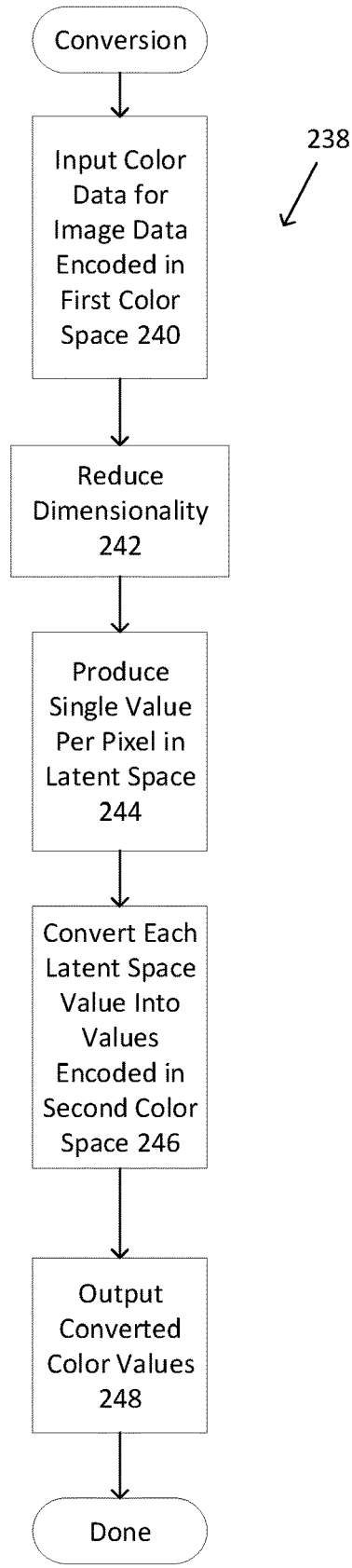
FIG. 2B depicts a flowchart of illustrative steps for performing color conversion in an exemplary embodiment.

FIG. 2A depicts a block diagram of an illustrative neural network 200 for an exemplary embodiment. The neural network 200 may be a variational auto-encoder. The neural network 200 is trained on images that start in a source color space and has multiple target color spaces for the output. The operation of the neural network 200 will be described with reference to the flowchart 238 of FIG. 2B. The neural network 200 may include an input layer 202 for receiving input. In the exemplary embodiments, the input may be color data for an image encoded in a first color space (240). The input is then processed by intermediate layers 204, which may include convolutional layers, sparse convolutional layers, pooling layers and the like. These intermediate layers 204 perform the encoding operation on the input. The intermediate layers 204 reduce the dimensionality of the input (242). This reduction in dimensionality may be performed by sparse convolutional or pooling layers. The intermediate layers 204 produce a single value per input element (e.g., pixel, voxel, etc.) (244). Thus, the input layer 202 and the intermediate layers act as an encoder 212 for encoding values 207 in a latent space 206. The values are the embeddings, and the latent space is a representation of compressed data in which similar data points are closer together in space.

The intermediate layers 208 may process the values 207 to produce the color data values encoded in the second color space, which differs from the first color space. In particular, each of the values 207 in the latent space is decoded to produce color values for elements of an image in the second color space (246). The dimensionality of the resulting color data values in the second color space may be expanded relative the values 207 in the latent space 206. The intermediate layers 208 may include deconvolutional layers that increase dimensionality. The resulting converted color data is then output by the output layer 210 (248). The intermediate layers 208 and the output layer 210 form a decoder 214 hence form a decoder that decode the values 207 in the latent space to produce a reconstructed image encoded in the second color space.

The neural network 200 need not be limited to input encoded in a particular color space; rather the neural network 200 may be able to encode input color data for an image encoded in different color spaces. For example, as shown in FIG. 3, encoders may be trained and used for encoding from different color spaces into values 207 the latent space 206. For example, an encoder 304 may receive input color data for an image encoded in the RGB color space (i.e., an RGB value 302) and produce a latent value 306 (i.e., an embedding). Similarly, an encoder 310 may receive a LAB value 308 input (i.e., color data for an image encoded in the LAB color space) and convert it into a latent value 312. Likewise, an encoder 316 receives a CMYK value 314 and produces an output latent value 318. These examples are illustrative and not intending to be limiting or exhaustive. Once the neural network 200 has the various encoders 304, 310 and 316, the neural network may choose which encoder to use based on the input.

Figure 4:
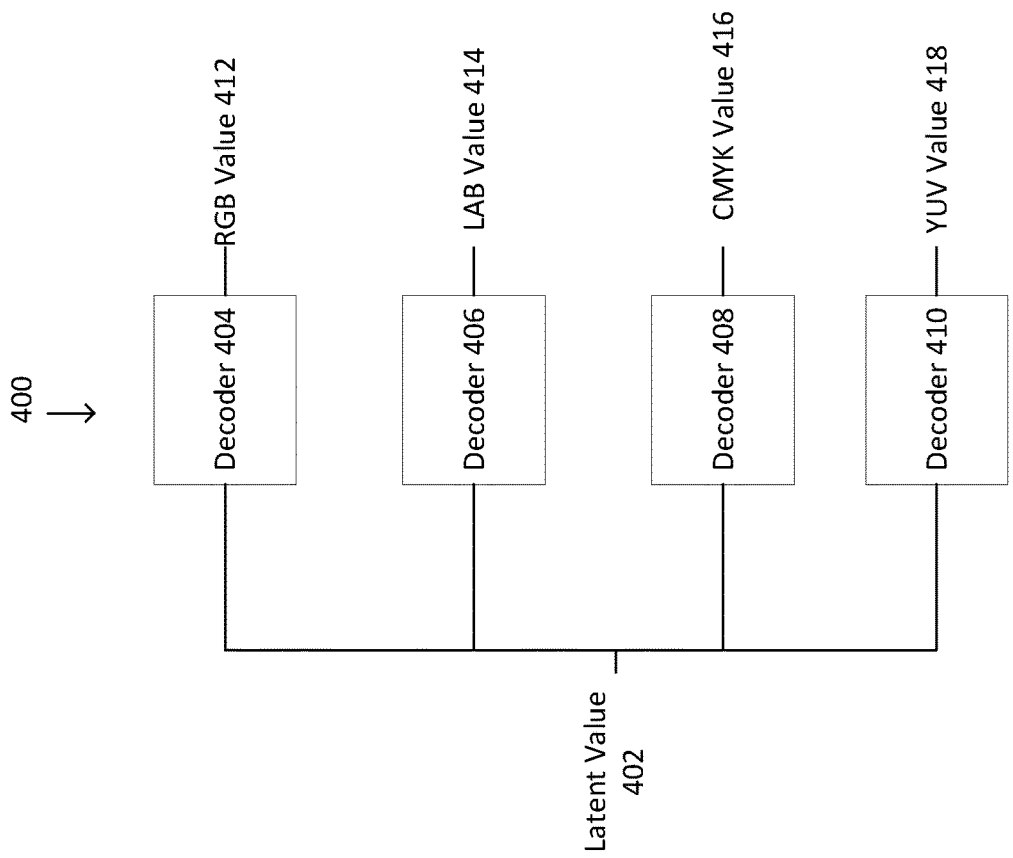
FIG. 4 depicts a block diagram of illustrative decoders.

The neural network may train and use a number of different decoders as well. FIG. 4 shows an example where there are four decoders 404, 406, 408 and 410 that may be used to decode a latent value 402 into different respective color space values. For instance, decoder 404 outputs an RGB value 412, decoder 406 outputs a LAB value, decoder 408 outputs a CMYK value and decoder 410 outs a YUV value. Decoders may also be trained and used that produce outputs encoded in other color spaces. Depending on the desired color space output, the neural network may choose the appropriate decoder.

The neural network 200 thus may mix and match the encoders and decoders based on the input and desired output. For example, encoder 304 may be paired with decoder 406 to convert an RGB input into a LAB output, or encoder 310 may be paired with decoder 410 to convert a LAB input into an YUV output. The neural network may be multimodal to accommodate these numerous options.

Figure 5:
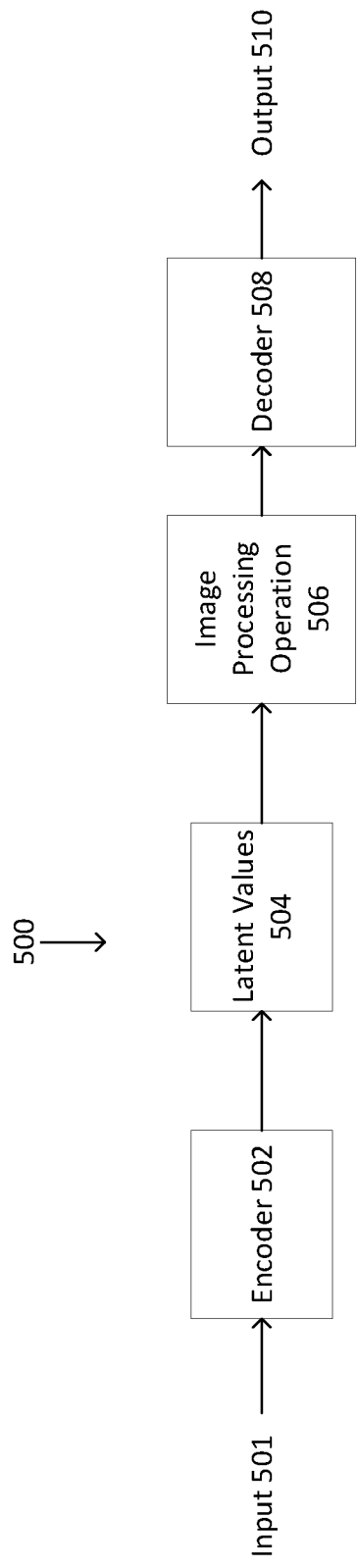
FIG. 5 depicts a block diagram where in an image processing operation is performed on values in a latent space.

The above discussion has focused on instances where the values 207 in the latent space 206 are directly converted into values encoded in the second color space without any intervening processing. FIG. 5 depicts an arrangement 500 in which intervening processing occurs. In FIG. 5, input color data for an image encoded in a first color space is input to encoder 502. The encoder is part of a neural network 200. The encoder 502 encodes the input 501 into latent values 504. At least one image processing operation 506 is performed on the latent values 504. The processed latent values are passed to decoder 508, which produces output color data 510 for an image encoded in a second color space. The image processing operations may be performed more quickly and/or consuming less computational or memory resources due to the compressed nature of the latent values relative to the input 501.

Figure 6:
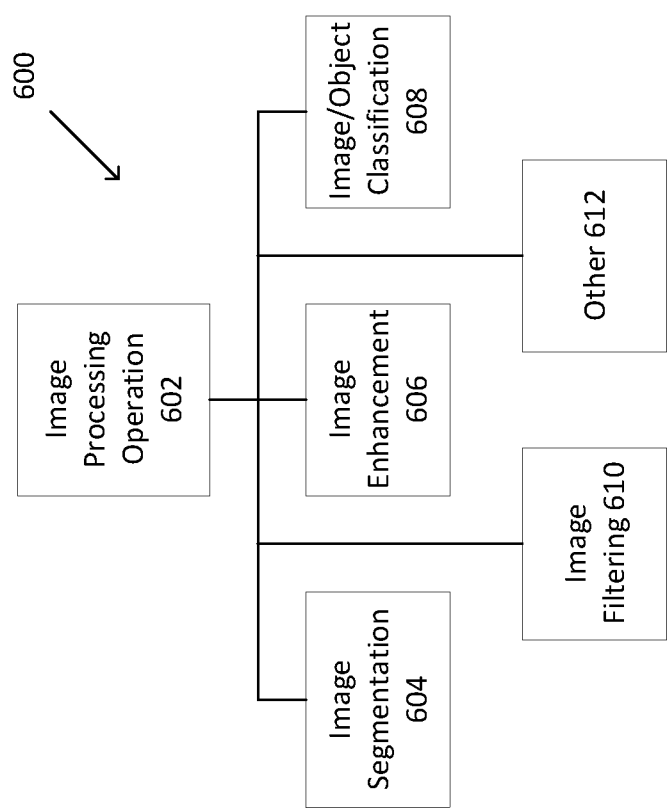
FIG. 6 depicts a diagram of possible image processing operations.

FIG. 6 depicts a diagram 600 of different image processing operations 602 that may be performed in 506. Image segmentation 604 may be performed. Image segmentation 604 partitions a digital image into segments (e.g., sets of pixels) that are useful in locating objects and boundaries in the image. Image enhancement 606 may be performed. Image enhancement may remove noise, sharpen the image and/or brighten the image, for example. Image or object classification 608 may be performed. For example, the identity of objects in an image (e.g., a hat) may be determined or the identity of what is depicted may be determined (e.g., the image is of a horse). Image filtering 610 may be performed and other operations 612 may be performed.

It should be appreciated that the image processing operation 506 need not be performed before decoding. In some exemplary embodiments, the image processing operation 506 is better performed in the second color space. As such, the image processing operation 506 is performed on the output in the second color space. For example, it may be easier to detect objects in the LAB color space rather than the RGB color space.

Figure 7:
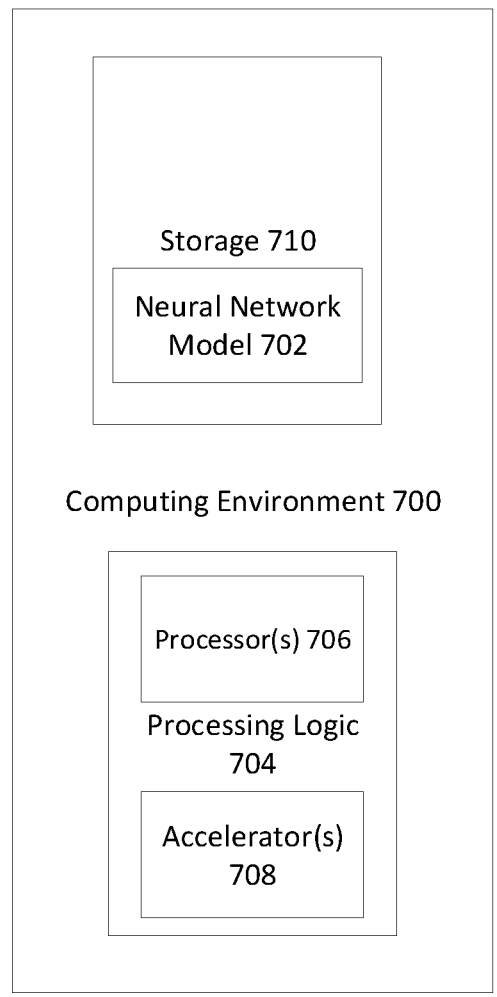
FIG. 7 depicts a block diagram of a computing environment suitable for an exemplary embodiment.

FIG. 7 depicts a computing environment 700 suitable for practicing the exemplary embodiments. The computing environment 700 may include a neural network model 702 for implementing the neural network used in the color conversion. The neural network model 702 may be implemented in software executed by processing logic 704. The processing logic 704 may include one or more processors 706, such as central processing units (CPUs), graphics processing units (GPUs), application specific integrated circuits (ASICs) or field programmable gate arrays (FPGAs). The processors 706 may each include multiple cores or multiple interconnected processing units. The processing logic may include one or more accelerators 708. The accelerators may include circuitry and custom hardware for speeding the execution of the neural network model 702. The custom hardware may include a processor optimized for handling neural network operations. The processing logic may be contained in a single computer, like a personal computer (PC) or a server, or may be spread across multiple computers, such as in a server cluster, in a cloud computing environment or across peer computing systems.

The computing environment 700 may include a storage 710 for storing the neural network model 702. The storage 710 may include a magnetic storage device, an optical storage device or a combination thereof. The storage 710 may include solid state storage, hard drives, removable storage elements such as magnetic disks, optical disks, thumb drives, or the like. The storage 1104 may include RAM, ROM, and other varieties of integrated circuit storage devices. The storage may be a singular storage device or may include multiple devices located together or remotely from each other. The storage 710 may include non-transitory computer-readable storage media, such as the types of memory and storage described above. The non-transitory computer-readable storage media may include computer program instructions for realizing the functionality of the exemplary embodiments described above. These instructions may include those of the neural network model 702.

While the present application has been described with reference to exemplary embodiments herein, it will be appreciated that various changes in form and detail may be made without departing from the intended scope as defined in the appended claims.

What is claimed is:
1. A method, comprising:
   determining, by a neural network, a first color space of an image received as input, the image encoded in the first color space;

selecting, by the neural network based on the determined first color space of the image, a first encoder of a plurality of encoders to convert respective pixels of a first plurality of pixels of the image into a respective single-dimensional color value;

converting, by the first encoder, the respective pixels of the first plurality of pixels of the image into the respective single-dimensional color value;

selecting, by the neural network based on an output color space that is different than the first color space, a first decoder of a plurality of decoders to decode each respective single dimensional color value into a respective pixel of a second plurality of pixels in the output color space; and decoding, by the first decoder, each respective single dimensional color value into the respective pixel of the second plurality of pixels in the output color space.

2. The method of claim 1, wherein respective ones of the plurality of encoders and the plurality of decoders are trained using distinct color spaces.

3. The method of claim 1, further comprising:
performing an image processing operation on the single-dimensional color values.

4. The method of claim 1, wherein the second plurality of pixels in the output color space are compressed relative to the first plurality of pixels in the first color space.

5. The method of claim 1, wherein a plurality of embedding values include the single-dimensional color values.

6. The method of claim 1, wherein the image is a three-dimensional image, wherein a plurality of voxels of the three-dimensional image include the first plurality of pixels, wherein the first encoder encodes the plurality of voxels into the respective single-dimensional color values.

7. The method of claim 1, wherein the first color space or the output color space is one of a RGB color space, an LAB color space, an HSV color space, a CMYK color space, a YUV color space, a HSL color space, an ICtCp color space, or a CIE color space.

8. A non-transitory computer-readable storage medium, the computer-readable storage medium including instructions that when executed by a processor, cause the processor to:

determine, by a neural network, a first color space of an image received as input, the image encoded in the first color space;

select, by the neural network based on the determined first color space of the image, a first encoder of a plurality of encoders to convert respective pixels of a first plurality of pixels of the image into a respective single-dimensional color value;

convert, by the first encoder, the respective pixels of the first plurality of pixels of the image into the respective single-dimensional color value;

select, by the neural network based on an output color space that is different than the first color space, a first decoder of a plurality of decoders to decode each respective single dimensional color value into a respective pixel of a second plurality of pixels in the output color space; and decode, by the first decoder, each respective single dimensional color value into the respective pixel of the second plurality of pixels in the output color space.

9. The computer-readable storage medium of claim 8, wherein the instructions further cause the processor to:
perform an image processing operation on the single-dimensional color values.

10. The computer-readable storage medium of claim 8, wherein respective ones of the plurality of encoders and the plurality of decoders are trained using distinct color spaces.

11. The computer-readable storage medium of claim 8, wherein the second plurality of pixels in the output color space are compressed relative to the first plurality of pixels in the first color space.

12. The computer-readable storage medium of claim 8, wherein a plurality of embedding values include the single-dimensional color values.

13. The computer-readable storage medium of claim 8, wherein the image is a three-dimensional image, wherein a plurality of voxels of the three-dimensional image include the first plurality of pixels, wherein the first encoder encodes the plurality of voxels into the respective single-dimensional color values.

14. The computer-readable storage medium of claim 8, wherein the first color space or the output color space is one of a RGB color space, an LAB color space, an HSV color space, a CMYK color space, a YUV color space, a HSL color space, an ICtCp color space, or a CIE color space.

15. A computing apparatus comprising:
a processor; and
a memory storing instructions that, when executed by the processor, cause the processor to:

determine, by a neural network, a first color space of an image received as input, the image encoded in the first color space;

select, by the neural network based on the determined first color space of the image, a first encoder of a plurality of encoders to convert respective pixels of a first plurality of pixels of the image into a respective single-dimensional color value;

convert, by the first encoder, the respective pixels of the first plurality of pixels of the image into the respective single-dimensional color value;

select, by the neural network based on an output color space that is different than the first color space, a first decoder of a plurality of decoders to decode each respective single dimensional color value into a respective pixel of a second plurality of pixels in the output color space; and decode, by the first decoder, each respective single dimensional color value into the respective pixel of the second plurality of pixels in the output color space.

16. The computing apparatus of claim 15, wherein respective ones of the plurality of encoders and the plurality of decoders are trained using distinct color spaces.

17. The computing apparatus of claim 15, wherein the instructions further cause the processor to:
perform an image processing operation on the single-dimensional color values.

18. The computing apparatus of claim 15, wherein the second plurality of pixels in the output color space are compressed relative to the first plurality of pixels in the first color space.

19. The computing apparatus of claim 15, wherein a plurality of embedding values include the single-dimensional color values.

20. The computing apparatus of claim 15, wherein the first color space or the output color space is one of a RGB color space, an LAB color space, an HSV color space, a CMYK color space, a YUV color space, a HSL color space, an ICtCp color space, or a CIE color space.

* * * * *